(12) United States Patent
Reast et al.

(10) Patent No.: US 7,372,864 B1
(45) Date of Patent: May 13, 2008

(54) REASSEMBLY OF DATA FRAGMENTS IN FIXED SIZE BUFFERS

(75) Inventors: Dayne A. Reast, San Jose, CA (US); Benjamin Hur, Mountain View, CA (US); Sangyu Wang, Sunnyvale, CA (US)

(73) Assignee: Applied Micro Circuits Corporation, San Diego, CA (US)

( * ) Notice: Subject to any disclaimer, the term of this patent is extended or adjusted under 35 U.S.C. 154(b) by 997 days.

(21) Appl. No.: 10/211,098

(22) Filed: Aug. 1, 2002

(51) Int. Cl.
*H04L 12/54* (2006.01)
*H04J 3/07* (2006.01)

(52) U.S. Cl. .................................. 370/428; 370/505
(58) Field of Classification Search ................ 370/428, 370/473, 474, 230.1, 505, 506
See application file for complete search history.

(56) References Cited

U.S. PATENT DOCUMENTS

| | | | |
|---|---|---|---|
| RE31,182 E | 3/1983 | Crager et al. ................... 178/3 |
| 5,383,182 A | 1/1995 | Therasse et al. ............... 370/60 |
| 5,590,122 A | 12/1996 | Sandorfi et al. ............. 370/394 |
| 5,781,549 A | 7/1998 | Dai ............................. 370/398 |
| 5,809,024 A * | 9/1998 | Ferguson et al. ....... 370/395.53 |
| 5,870,394 A | 2/1999 | Oprea ......................... 370/392 |
| 5,901,147 A | 5/1999 | Joffe |
| 6,128,278 A | 10/2000 | Joffe et al. |
| 6,148,000 A | 11/2000 | Feldman et al. ............. 370/397 |
| 6,266,687 B1 | 5/2001 | Harriman et al. ........... 709/246 |
| 6,246,684 B1 | 6/2001 | Chapman et al. ........... 370/394 |
| 6,249,528 B1 | 6/2001 | Kothary ....................... 370/466 |
| 6,259,699 B1 * | 7/2001 | Opalka et al. ............... 370/398 |
| 6,307,860 B1 | 10/2001 | Joffe et al. |
| 6,314,101 B1 | 11/2001 | Rezaiifar et al. ............ 370/394 |
| 6,317,433 B1 * | 11/2001 | Galand et al. ............ 370/395.2 |
| 6,330,584 B1 | 12/2001 | Joffe et al. |
| 6,388,994 B1 * | 5/2002 | Murase ........................ 370/235 |
| 6,404,752 B1 * | 6/2002 | Allen et al. .................. 370/335 |
| 6,463,067 B1 | 10/2002 | Hebb et al. .................. 370/413 |
| 6,556,568 B2 * | 4/2003 | Sasaki ....................... 370/395.1 |

(Continued)

OTHER PUBLICATIONS

Entire Prosecution History of U.S. Appl. No. 10/211,080 filed by Ari Birger et al, on Aug. 1, 2002, including an Office Action dated Sep. 11, 2006.

(Continued)

*Primary Examiner*—Chau Nguyen
*Assistant Examiner*—Marcus R Smith
(74) *Attorney, Agent, or Firm*—Silicon Valley Patent Group LLP; Omkar Suryadevara

(57) ABSTRACT

A reassembly and/or a segmentation function is spread across (i.e. partially performed in) each of two (or more) network processors, with use of buffers in a storage device to temporarily buffer data that is received in one or more ingress data units. In using the buffers, no attempt is made to completely fill each buffer. Instead, filling of data into a current buffer is stopped (and the remainder of current buffer is filled with padding) if there is no more data available, or if sufficient data has been accumulated to form an egress data unit. If there is any more data available, the remaining data is stored in a next buffer that remains partially filled (remainder filled with padding). Such partially filled buffers serve as temporary storage until additional data is received.

8 Claims, 12 Drawing Sheets

U.S. PATENT DOCUMENTS

| | | | |
|---|---|---|---|
| 6,654,343 B1 | 11/2003 | Brandis et al. | 370/229 |
| 6,687,246 B1* | 2/2004 | Wolrich et al. | 370/388 |
| 6,714,985 B1 | 3/2004 | Malagrino et al. | 709/236 |
| 6,937,606 B2* | 8/2005 | Basso et al. | 370/412 |
| 6,954,430 B2* | 10/2005 | Haglund | 370/232 |
| 7,058,057 B2 | 6/2006 | Dooley et al. | 370/394 |
| 7,072,342 B1 | 7/2006 | Elnathan | 370/394 |
| 7,092,409 B2* | 8/2006 | Chun et al. | 370/507 |
| 2003/0074388 A1* | 4/2003 | Pham et al. | 709/106 |

OTHER PUBLICATIONS

"Reconsidering Fragmentation and Reassembly" by Girish P. Chandranmenon and George Varghese, believed to be published at Seventeenth ACM Symposium on Principles of Distributed Computing (PODC '98), at a conference held in Peurto Vallarta, Jun. 28-Jul. 2, 1998.

Shan, N. "Understanding Network Processors", Version 1.0, University of California, Berkeley, Sep.,2001, http://courses.ece.uiuc.edu/ece511/papers/np.pdf, pp. 93.

The ATM Forum Technical Committee, "ATM Trunking using AAL2 for Narrowband Services", AF-VTOA-0113.000, Feb., 1999, pp. 58.

* cited by examiner

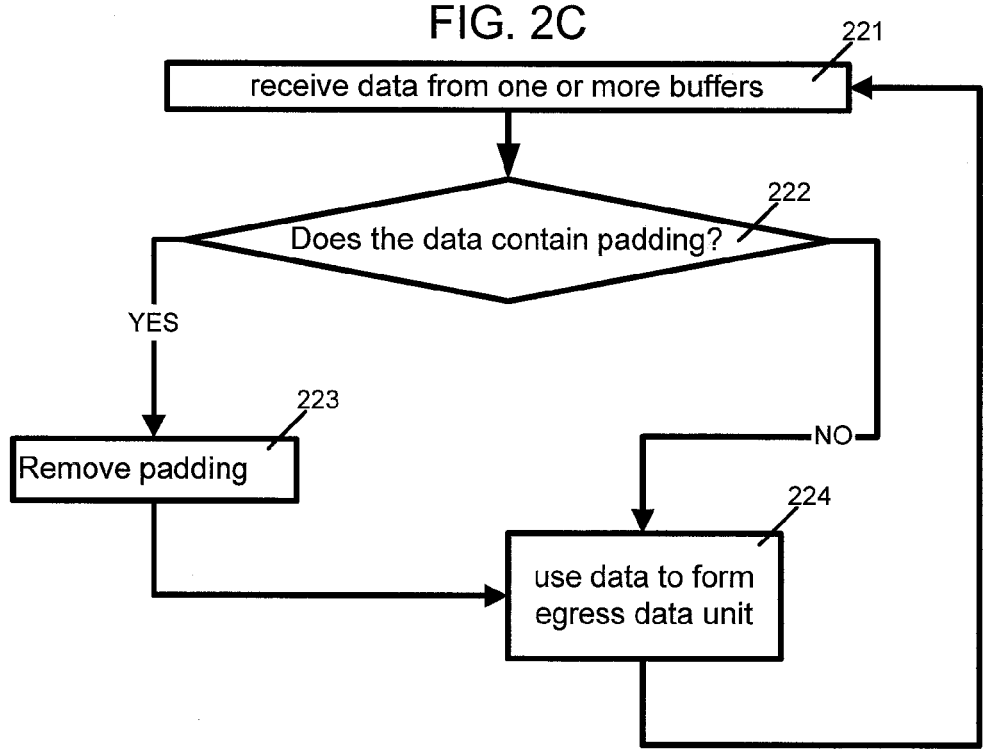

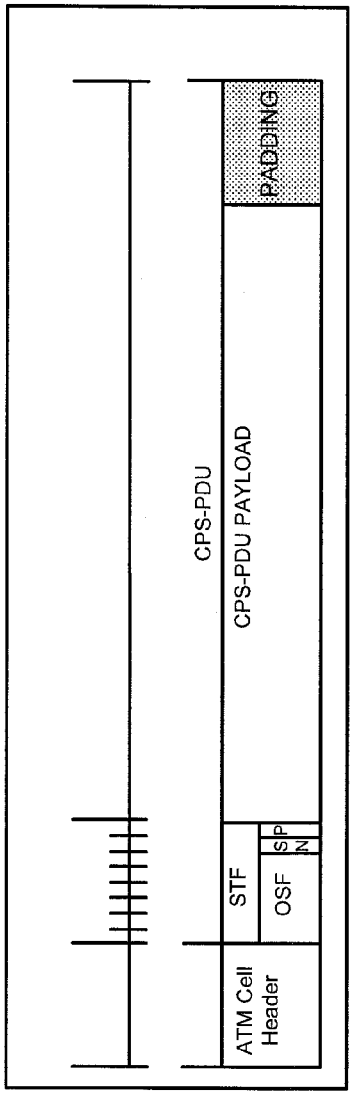

| Mnemonic | Field Name | Number of bytes/bits | Description |
|---|---|---|---|
| | ATM Cell Header | 4 to 8 bytes, depending upon bus width | Standard ATM cell header, including GFC, VPI, VCI, PTI and CLP fields |
| STF | Start Field | 8 bits | Contains OSF, SN and P fields described below |
| OSF | Offset Field | 6 bits | Pointer to the start of the first complete CPS Packet in the cell |
| SN | Sequence Number | 1 bit | Modulo 2 sequence number |
| P | Parity | 1 bit | Odd parity over 8-bit |
| | CPS-PDU Payload | 1 to 47 bytes | |
| | Padding | 0 to 47 bytes | Padding inserted to fill cell |

FIG. 4C (prior art)

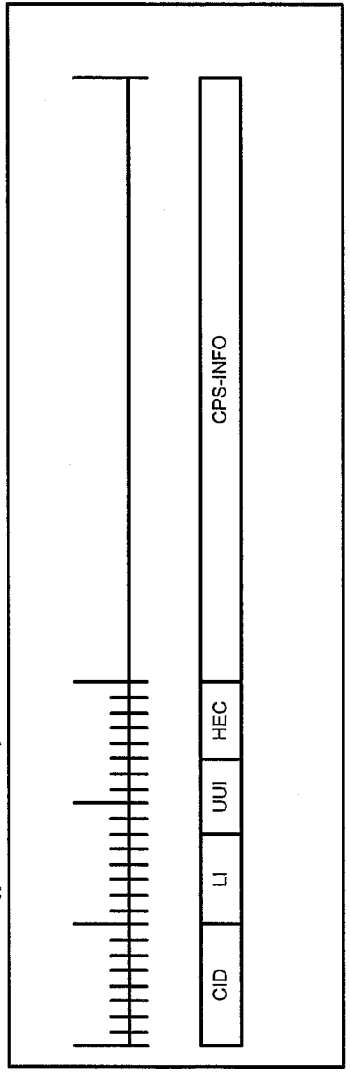

| CID | LI | UUI | HEC | CPS-INFO |

FIG. 4D (prior art)

| Mnemonic | Field Name | Number of bytes/bits | Description |
|---|---|---|---|
| CID | Channel Identifier | 8 bits | Identifies the AAL2 CPS user of the channel<br>0- not used<br>1 to 7 - Reserved for layer management peer-to-peer procedures and signaling<br>8 to 255 - Available for AAL2 user entities |
| LI | Length Indicator | 6 bits | Value one less than the number of octets in the CPS Packet Payload |
| UUI | User-to-User Indication | 5 bits | User data between users and/or layer management<br>0 to 31 - Reserved for codepoints including indentifying packet encoding formats, and packet types |
| HEC | Header Error Control | 5 bits | 5-bit HEC over CPS Packet Header |
| CPS-INFO | | 1 to 45/64 bytes | Packet payload<br>Default maximum is 45 bytes |

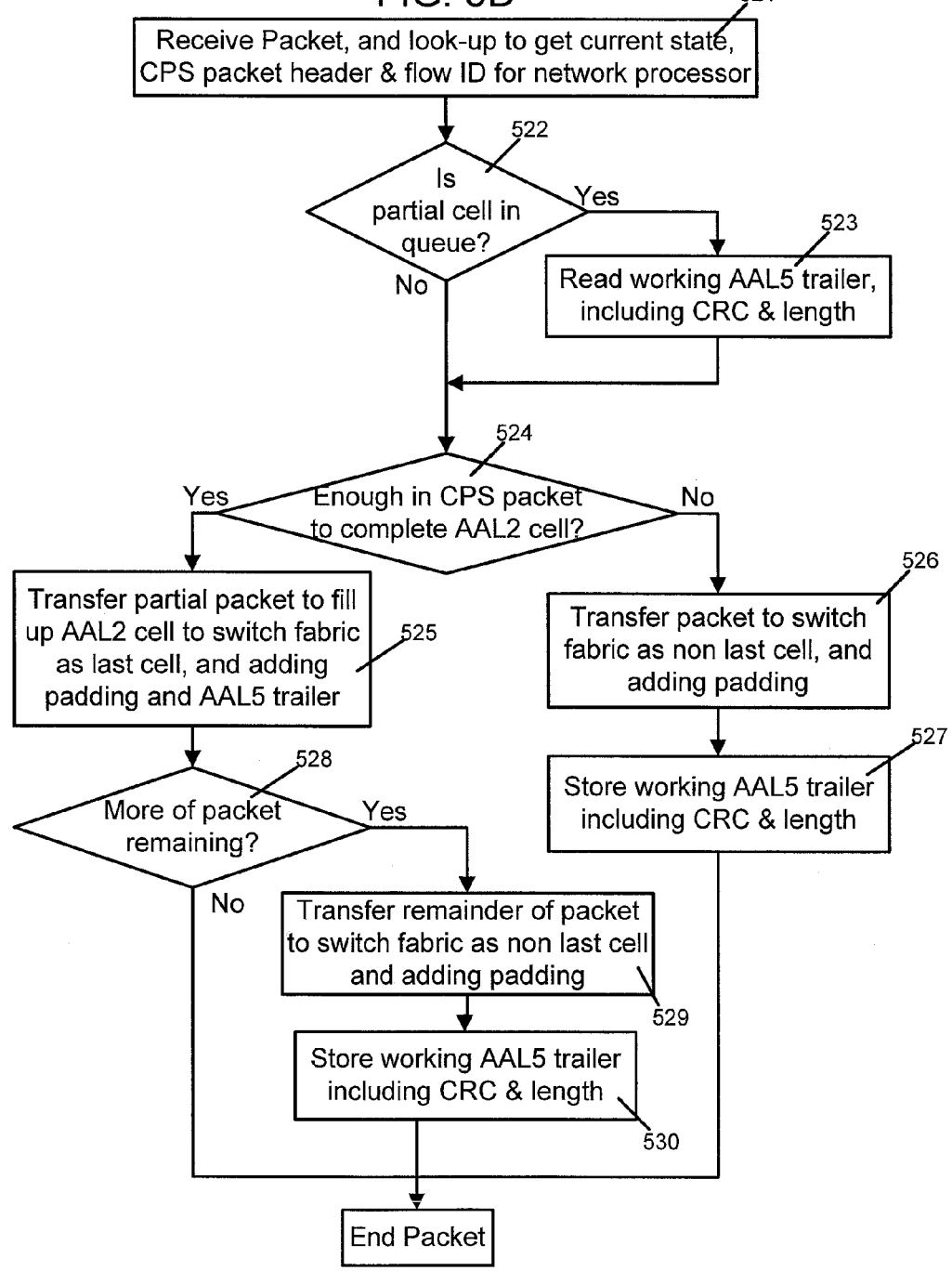

REASSEMBLY OF DATA FRAGMENTS IN FIXED SIZE BUFFERS

CROSS-REFERENCE TO RELATED APPLICATION

This application is related to and incorporates by reference herein in its entirety a commonly owned and concurrently filed U.S. application Ser. No. 10/211,080 entitled "Reassembly of Out-of-order Data Fragments In A Network" by Ari Birger, Dayne A. Reast and Benjamin Hur.

BACKGROUND OF THE INVENTION

Segmentation and reassembly (SAR) of units of data (such as packets or cells) that are transferred between elements (also called "store and forward elements") of a communication network is performed to break up large data units into smaller, more manageably sized data units. The need to break up a data unit may arise, for example, if the data unit is of a length greater than a maximum length permitted by a portion of the network. Once broken up, such fragments of a data unit are sequentially transmitted, may traverse different network paths, and must be reassembled at a destination.

For example, when performing voice trunking over ATM (asynchronous transfer mode) using AAL2 for narrowband services (e.g. as described in ATM Forum standard AF-VTOA-0113.000), a number of packets (called CPS packets) are generated and embedded in ATM cells that are transmitted to a remote device. CPS stands for "common part sublayer". At the destination, a number of ATM cells are processed by a SAR device 101 (FIG. 1A) to recover the CPS packets. SAR device 101 may use an external memory to temporarily hold data during such processing. Depending on the application, several CPS packets may be received, as payload in an ATM cell. In some cases, only a portion of a CPS packet is present at the end of the cell, with the remainder of the packet being at the beginning of the next cell.

A network processor 102 and a switch fabric 103 normally process each CPS packet retrieved by the SAR device. For example, network processor 102 may perform classification, metering and/or ATM policing of the CPS packets, collect statistics, and perform operation and maintenance (OAM) functions. Switch fabric 103 (and/or a traffic manager) provides a number of fixed size buffers for temporary storage, and also performs per-flow queuing and scheduling, implements dynamic discard thresholds and random early detection. Switch fabric 103 (and/or a traffic manager) is typically connected to other network processors either directly or via an interconnect fabric (not shown).

Instead of performing segmentation and reassembly (SAR) in hardware, these functions can be implemented in software that is programmed into network processor 106 (FIG. 1B). In such a case, network processor 106 may use a doubly linked list implemented in a memory 105 to temporarily hold the data. For example, if an incoming unit of data is a fragment of a packet in conformance with the Internet Protocol (IP), network processor 102 may attempt to match its source and destination addresses to an existing entry in such a linked list. If there is a match, network processor 106 may check if the complete datagram has arrived and if not, add the fragment to the linked list for use in future when the last fragment has arrived. Otherwise, if the complete datagram has arrived, network processor 106 may assemble the datagram in sequence and then transmit the datagram to a queue in switch fabric 103 (also called egress queue).

Instead of using a doubly linked list, a software implementation in network processor 106 may use a number of queues also implemented in memory 105, with each queue being limited to holding multiple fragments of a single datagram. Note that in FIGS. 1A and 1B, the network processors may be identical although different reference numbers 102 and 106 have been used to indicate that these network processors are programmed differently.

Network processors (also called communications processors) of the type described above may perform one or more of the following functions (called "network processing functions"): parsing, searching, resolving and modifying. During parsing, a network processor analyzes and classifies the contents of the header and fields. During searching, tables are searched for a match between the content that was classified and pre-defined content and rules. During resolving, the destination and quality of service (QoS) requirements are resolved and the packet/cell is routed to its destination. During modifying, where necessary, the packet/cell is modified, e.g. certain fields (such as time to live and checksum) within the packet/cell are changed. Examples of commercially available network processors include: Intel's IXP1200, Agere's Payload Plus, AMCC's nP7250, IBM's PowerNP NP4GS3, Motorola's C-Port C-5 and Vitesse's IQ2000.

A network processor of the type described above is typically coupled to and used with a traffic manager and/or a switch fabric. Either or both devices (traffic manager and/or switch fabric) may perform one or more of the following functions: queuing and output scheduling (round robin, weighted fair queuing), policing of traffic flows to assure quality of service, traffic shaping (e.g. to meet delay or jitter requirements), statistics collection, congestion management and provisioning. Examples of commercially available devices that perform switch fabric functions include: Motorola's Q5 TMC, and AMCC's nPX5710/nPX5720 (together referred to as nPX5700).

For traffic management as well as for switching, each packet/cell must be stored in memory and later transmitted. The above-described functions may be implemented together in a chipset consisting of two chips: a traffic manager (such as AMCC's nPX5710) and a memory manager (such as AMCC's nPX5720). The just-described two chips are normally used together and frequently treated as a single device that contains queues. Such a queue-containing device may have four ports, each of which is coupled to a network processor by serial links operating at 2.5 Gbps or 10 Gbps.

Buffering of traffic is typically implemented via an external memory attached to the memory manager. Typical requirements in today's networks may require traffic up to two hundred and fifty six thousand (256K) queues to be managed. In some implementations, at any given time, only information related to a subset of these queues (e.g. up to eight thousand queues) may be cached on chip (e.g. in DDR SDRAM or RDRAM) by taking advantage of statistical multiplexing (i.e. the likelihood that the incoming traffic belongs to more than eight thousand queues is very low). Therefore, eight thousand queues (containing packets/cells) are stored in a buffering chip (such as AMCC's nPX5720) having embedded DRAM channels for example, and these queues are managed by a control logic chip (such as AMCC's nPX5710). These two chips when used together act as a switch fabric and traffic manager.

Incorporated by reference herein in their entirety are the following references:

U.S. Pat. No. 6,307,860 granted to Joffe, et al. on Oct. 23, 2001, and entitled "Systems and methods for data transformation and transfer in networks";

U.S. Pat. No. 6,330,584 granted to Joffe, et al. on Dec. 11, 2001, and entitled "Systems and methods for multi-tasking, resource sharing and execution of computer instructions";

U.S. Pat. No. 5,901,147 granted to Joffe on May 4, 1999, and entitled "Apparatus and methods to change thresholds to control congestion in ATM switches"; and U.S. Pat. No. 6,128,278 granted to Joffe, et al. on Oct. 3, 2000 and entitled "Cell queuing in ATM switches."

SUMMARY

In several embodiments, a reassembly and/or a segmentation function is spread across (i.e. partially performed in) each of ingress and egress software programmed into one (or more) network processors, with use of queues in a queuing device (such as a switch fabric or traffic manager) to temporarily buffer data. Use of queues in a queuing device (that normally uses queues for other functions such as traffic management or switching) to temporarily hold data while a network processor is waiting for additional data eliminates the need to use a memory located in or coupled to the network processor, for this purpose.

Eliminating usage of such a local memory reduces the number of instructions required in the network processor, thus improving network processor performance in a path (called "data path") of the data through the network processor. For example, instructions used to program a network processor to access local memory are eliminated. Moreover, such a reduction in instructions does not require an additional SAR device if SAR functions are performed in software by the ingress and egress network processors.

In some embodiments, on receipt of data in one or more data units (also called "ingress data units"), a network processor (also called "ingress network processor") transfers the data to an adjacent queuing device in the data path, to be held in a queue for the destination. Of note, the ingress network processor forwards the data to the next device in the direction of the destination (i.e. without diverting the data to a local memory for reassembly), and reassembly is performed in an inline manner as follows.

Specifically, the queue accumulates data until an indication that the last buffer has been received and that the accumulated data is ready to be transferred (e.g. last cell in packet indication). The indication is provided by the ingress network processor when the accumulated data is sufficient to form an egress data unit. If there is not enough data to from an egress data unit, the ingress network processor does not mark the data as last buffer. Such unmarked data remains in the adjacent queuing device in the data path until additional data from one or more ingress data units is received in an amount sufficient to form an egress data unit.

In many embodiments, such a queuing device (e.g. a switch fabric and/or traffic manager) implements each queue using a number of fixed size buffers. In using the buffers, no attempt is made by the ingress network processor to completely fill each buffer. Instead, filling of data into a current buffer is stopped (and the remainder of current buffer is filled with padding) if there is no more data available, or if sufficient data has been accumulated to form an egress data unit. In other words, data for each egress data unit is placed in one or a number of fixed size buffers, with the ingress network processor inserting padding in the last fixed size buffer on a need basis. Sufficient number of ingress data units are stored this way in a queuing device until an egress data unit can be formed.

Any remaining data is stored in a next buffer that remains partially filled. Such partially filled buffers serve as temporary storage until additional data is received in sufficient amount to form an egress data unit. Any padding inserted by the ingress network processor is removed by the egress network processor which assembles an egress data unit using data from the queue, thereby to complete the reassembly function.

In a similar manner, segmentation of one or more ingress data units among a number of egress data units may be spread across two (or more) network processors, and a queuing device may be used to temporarily store data while waiting for accumulation of data in an amount sufficient to form an egress data unit.

BRIEF DESCRIPTION OF THE DRAWINGS

FIGS. 2B and 2C illustrate, in flow charts, acts respectively performed by an ingress network processor and an egress network processor of the type illustrated in FIG. 2A.

FIGS. 4A and 4B illustrate, in a diagrammatical form and a table form, the prior art format of an ATM cell including a standard ATM cell header and a protocol data unit (PDU) of a CPS packet (including a 1 byte CPS header and up to 47 bytes of payload).

FIGS. 4C and 4D illustrate in a diagrammatical form and a table form, the prior art format of a CPS packet, one or more of which may be included in the 47 byte payload of FIGS. 4A and 4B.

FIGS. 5C and 5D illustrate, in a high level block diagram and a flow chart respectively, segmentation of a packet into completely filled cells by some embodiments of an ingress network processor and an egress network processor.

DETAILED DESCRIPTION

Figure 1A:
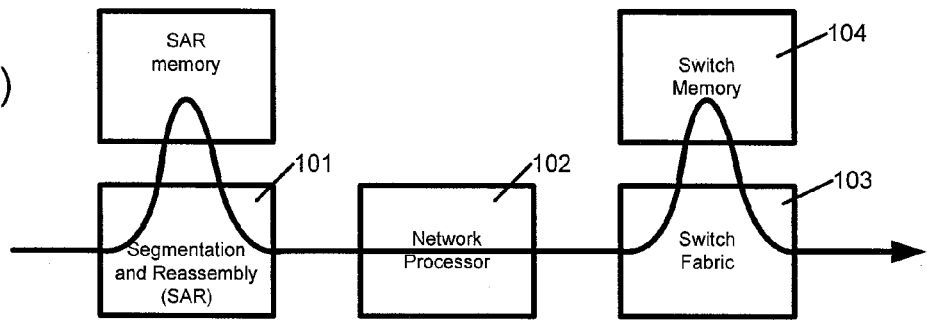
FIGS. 1A and 1B illustrate prior art implementation of reassembly in hardware (in a SAR device) and software (in a network processor) respectively.

In several embodiments, a number of data units (also called "ingress data units") that are received (as per act 211 in FIG. 2B) by a network processor (also called "ingress network processor") 202 (FIG. 2A) are immediately transferred to a switch fabric 103 (FIG. 2A) for storage therein. Switch fabric 103 (FIG. 2A) is identical to a prior art switch fabric, and for this reason the same reference number 103 is used in FIGS. 1A, 1B and 2A. Also, although the following description refers to use of queues in a switch fabric for reassembly, queues in any other queuing device (such as a traffic manager) may be used as described herein.

Figure 1B:
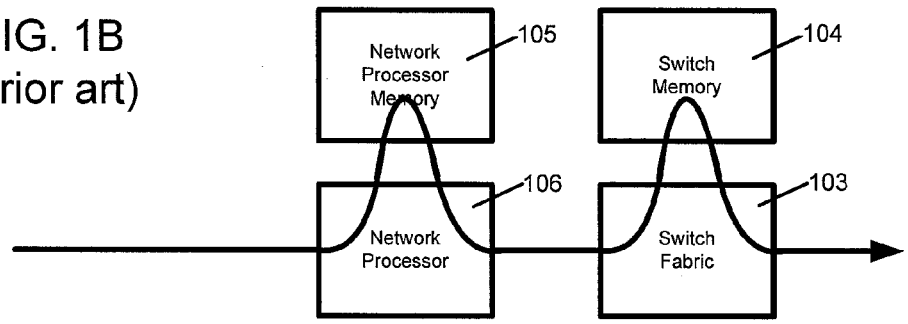

Therefore, in some embodiments, ingress network processor 202 (FIG. 2A) does not locally store the ingress data units in prior art memory 105 (FIG. 1B). Nor does ingress network processor 202 completely perform a reassembly function. Instead, only a portion of the reassembly function is performed by ingress network processor 202 and a remainder of the reassembly function is performed in an egress network processor 205.

In some embodiments, ingress network processor 202 and egress network processor 205 are both identical copies of a single network processor, such as EPIF-200 or nP7250 available from Applied Micro Circuits Corporation (AMCC)

that are coupled to one another via a switch fabric (also called "traffic manager") such as products nPX5400, nPX5500, or nPX5700 also available from AMCC. The just-described identical network processors are programmed appropriately to perform an ingress function and an egress function for a specific flow. A network processor that performs an ingress function for a specific flow may be programmed to perform an egress function for another flow, and vice versa. Furthermore, a single network processor may be programmed to perform both an ingress function and an egress function for a specific flow.

Figure 2A:
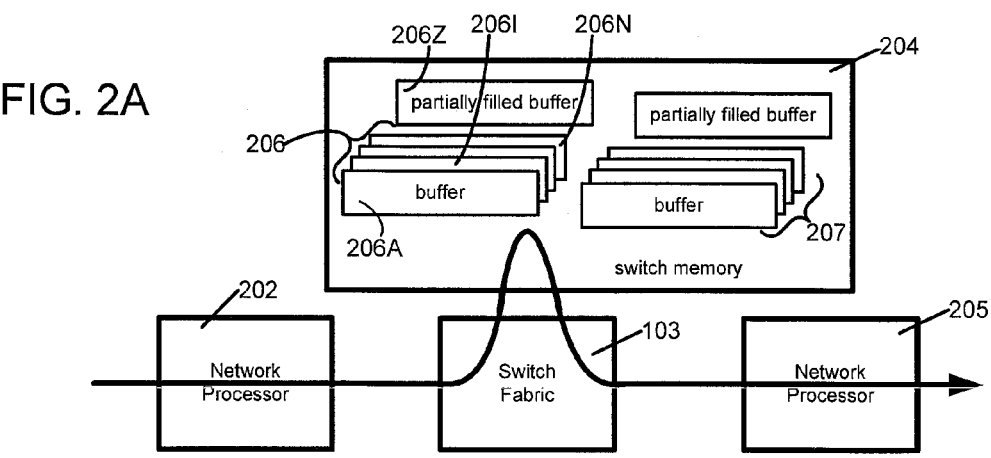
FIG. 2A illustrates, in a high level block diagram, several embodiments in which an ingress network processor and an egress network processor cooperate by using queues in a switch fabric to temporarily buffer data while waiting for data to accumulate in an amount sufficient to form an egress data unit.
Figure 2B:
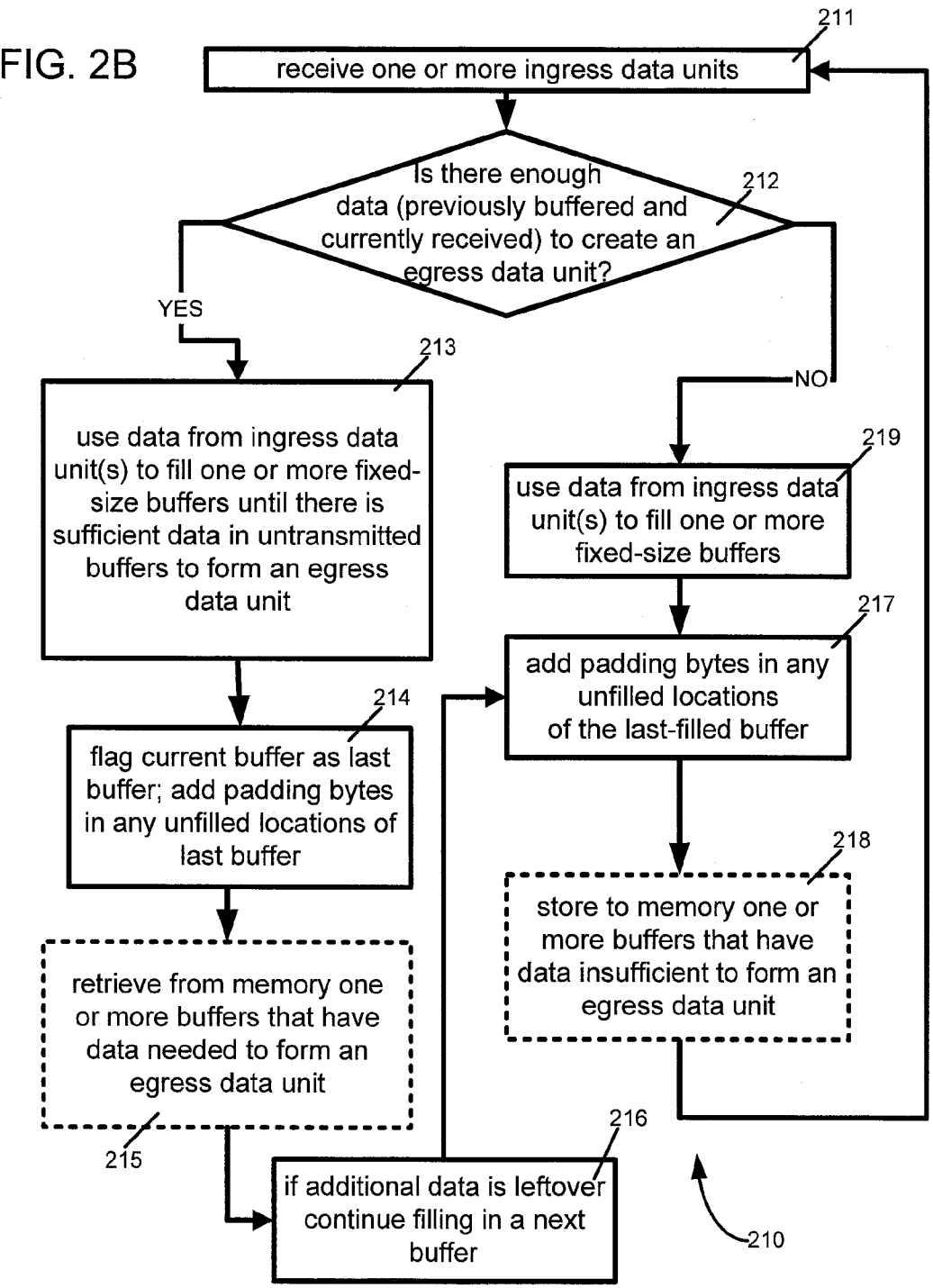

Moreover, although only one switch fabric is illustrated in FIG. 2A, any number of switch fabrics can be connected to one another, e.g. to form a mesh of switch fabrics (not shown) between ingress network processor 205 and egress network processor 206.

In several such embodiments, switch fabric 103 (FIG. 2A) maintains a number of fixed size buffers 206A-206N e.g. in switch memory 204 in which data from ingress data units is queued (e.g. in queue 206) for transmission to egress network processor 205. In filling data into buffers 206A-206N (wherein A≦I≦N, N being the total number of buffers currently in queue 206) no attempt is made by ingress network processor 202 to completely fill each buffer 206I. Any unused space in each buffer 206I is filled with bytes of padding that are automatically removed by another network processor (also called "egress network processor") 205 when processing data from the buffers 206A-206N. Note that switch fabric 103 manages a number of such queues, although only two queues 206 and 207 are illustrated in FIG. 2A.

In such embodiments, the amount of data placed in each buffer 206I is determined by ingress network processor 202 (FIG. 2A) based on the size of a data unit (also called "egress data unit") to be created after reading the data out of buffers 206A-206N e.g. by an egress network processor 205. Specifically, during filling of data into any buffer, ingress network processor 202 checks the following condition: is there is enough data either accumulated (in buffers 206A-206I that are awaiting transmission to egress network processor 205) or currently received (and to be filled into a buffer) sufficient to create an egress data unit (as per act 212 in FIG. 2B).

If this condition is met, then the currently received data is filled into additional buffers 206I+1 to 206N until the queue contains sufficient amount of data needed to form an egress data unit (as per act 213). At this stage if a last buffer 206N is only partially filled, the unfilled locations are filled with padding (as per act 214), and furthermore all buffers in queue 206 are flagged as being ready for transfer (as per act 214) to egress network processor 205. Depending on the implementation, only a last buffer 206N may be marked with an "L" flag (i.e. last buffer) to indicate that all preceding buffers and the last buffer are ready for transfer.

In the just-described situation, filling of data is stopped in last buffer 206N and additional data that remains to be stored (e.g. if there is data leftover from an ingress data unit), the filling of data is continued in a next buffer 206N+1 (not shown in FIG. 2A) until all the data is over, e.g. when a buffer 206Z is partially filled. At this stage, if the last-filled buffer 206Z is only partially filled, then padding bytes are filled in the unfilled locations (as per act 217), and then ingress network processor 202 returns to act 211 to handle more ingress data units.

If the above-described condition is not met (as per act 212 in FIG. 2B), ingress network processor 202 goes to act 219 (FIG. 2B) and uses data from one or more ingress data unit(s) to fill additional buffers 206I+1 to 206Z until the queue contains all currently received data. Here as well, if the last-filled buffer 206Z is only partially filled, then padding bytes are filled in the unfilled locations (as per act 217), and then ingress network processor 202 returns to act 211 to handle more ingress data units.

Note that switch fabric 103 automatically transfers the buffered data (as per act 218) to memory 204 (as per act 218) when buffers are filled but are not marked as being ready for transfer to the egress network processor. On the other hand when the buffered data is marked as being ready for transfer (e.g. at the end of act 214), switch fabric 103 automatically transfers the buffered data from memory 204. Memory 204 may be implemented off chip, i.e. separate from switch fabric 103 and coupled thereto with a bus that is as wide as a buffer. Depending on the implementation, such as bus may be wider than a buffer (e.g. ½ times as wide) or narrower than a buffer (e.g. M as wide).

When a buffer 206N is flagged as the last buffer, switch fabric 103 transfers data in each preceding buffer as well as data in the last buffer (e.g. in buffers 206A-206I) to egress network processor 205.

Any data leftover in the remaining buffers 206N+1 to 206Z is stored therein until additional data (from one or more additional ingress data units) is received sufficient to form another egress data unit.

Egress network unit 205 receives the data from a number of buffers (e.g. buffers 206A-206I) in an act 221 (FIG. 2C) and checks if the data contains padding (in act 222). If so, the padding is removed (as per act 223), and thereafter egress network unit 205 forms payload for an egress data unit (as per act 224) simply by concatenating all the received data.

Figure 3A:
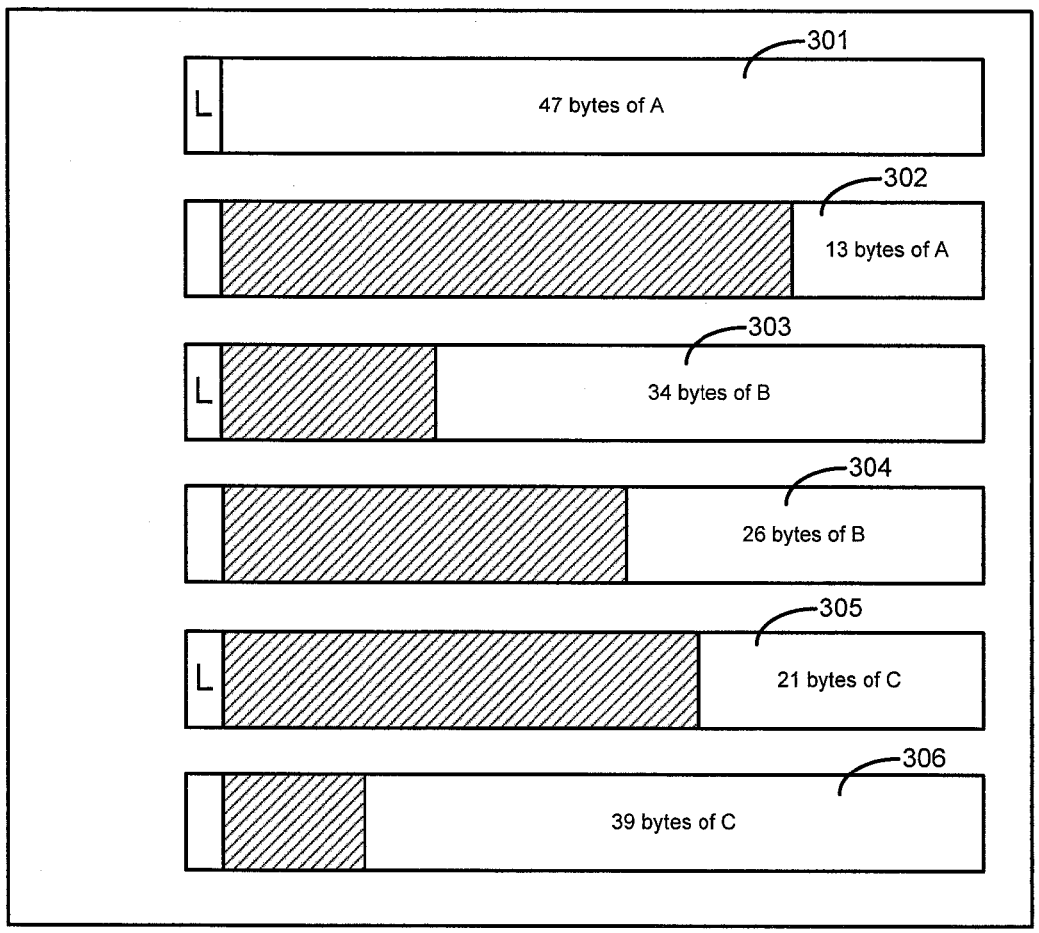
FIGS. 3A-3C illustrate examples of fixed size buffers used by a switch fabric to implement queues in three different examples in accordance with the invention.

In one example illustrated in FIG. 3A, three packets A, B, and C (not shown) each containing a payload of 60 bytes are received by an ingress network processor 202. Packets A, B and C may be, for example CPS packets of the type described above. Packets A-C are to be transferred in AAL2 cells that carry only 47 bytes of payload (e.g. because the payload is carried in ATM cells with one byte being used as AAL2 Start Field (STF)). In such a case, buffers that are 47 bytes in length are used.

In filling buffers 301-306 (FIG. 3A) on receipt of 60 bytes of packet A, ingress network processor 202 finds that there is enough data to fill a 47 byte payload (as per act 212 in FIG. 2B), and fills buffer 301 completely (as per act 213). Thereafter ingress network processor 202 flags buffer 301 as the last buffer (by setting the "L" flag) and there are no padding bytes to be added to buffer 301 (as per act 214). Next, ingress network processor 202 fills the remaining 13 bytes of additional data from packet A into the next buffer 302 (as per act 216), and thereafter fills the remainder of buffer 302 with padding bytes. At this stage, buffer 301 will be transferred to egress network processor 205, while buffer 302 will be transferred to memory.

At some later point in time, when a packet B is received, ingress network processor 202 fills 34 bytes of data from packet B into a buffer 303 as per act 212 because 13 bytes of data (from packet A) is already present (in the memory of switch fabric 103), ready for transfer. The number 34 is obtained by subtracting the already present bytes 13 from size 47 of the payload in a cell to be formed by the egress network processor 205. Therefore, although 60 bytes of data were received in packet B, only 34 bytes are filled into buffer 303 which is then flagged by setting the "L" flag. All unfilled locations in buffer 303 are filled with padding.

Furthermore, the remaining 26 bytes of data from packet B that are left over are filled in the next buffer 304. As all 60 bytes of packet B have been stored, all unfilled locations of buffer 304 are now filled with padding. The data in buffer 304 is held in switch fabric 103 until 21 bytes of additional data is received sufficient to form another 47 bytes of payload for a next cell. In this example, when packet C is received, 21 bytes of data are stored in the next buffer 305, the remaining unfilled locations in buffer 305 are filled with padding, and this buffer 305 is flagged by setting the "L" flag. The remaining 39 bytes of data from packet C are stored in a next buffer 306.

Figure 3B:
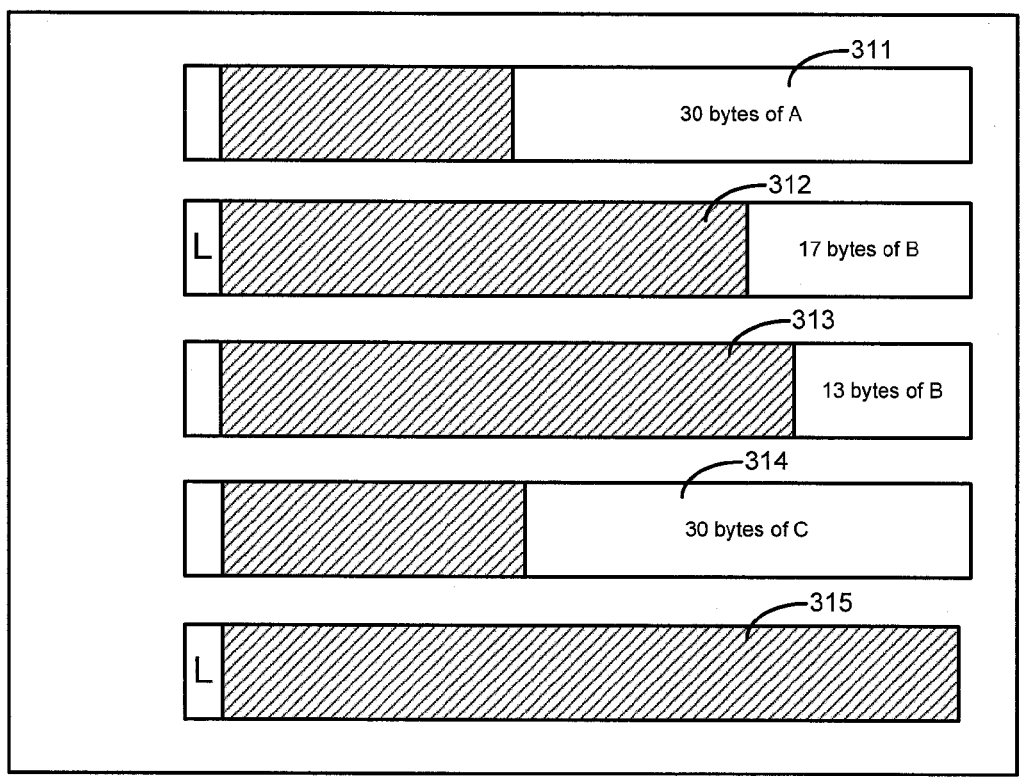

A similar example is illustrated in FIG. 3B wherein each of packets A, B and C have only 30 bytes of payload. In this instance, if no data is received for a long time, a timeout occurs to allow the egress cell to be transmitted incompletely filled. Ingress network processor 202 creates a dummy buffer 315 which is completely filled with padding, except that this buffer is flagged by setting the "L" flag. Buffer 315 causes switch fabric 103 to transfer the data in buffers 313 and 314 to egress network processor 205 that in turn transmits the cell not completely filled with CPS packets.

Figure 3C:
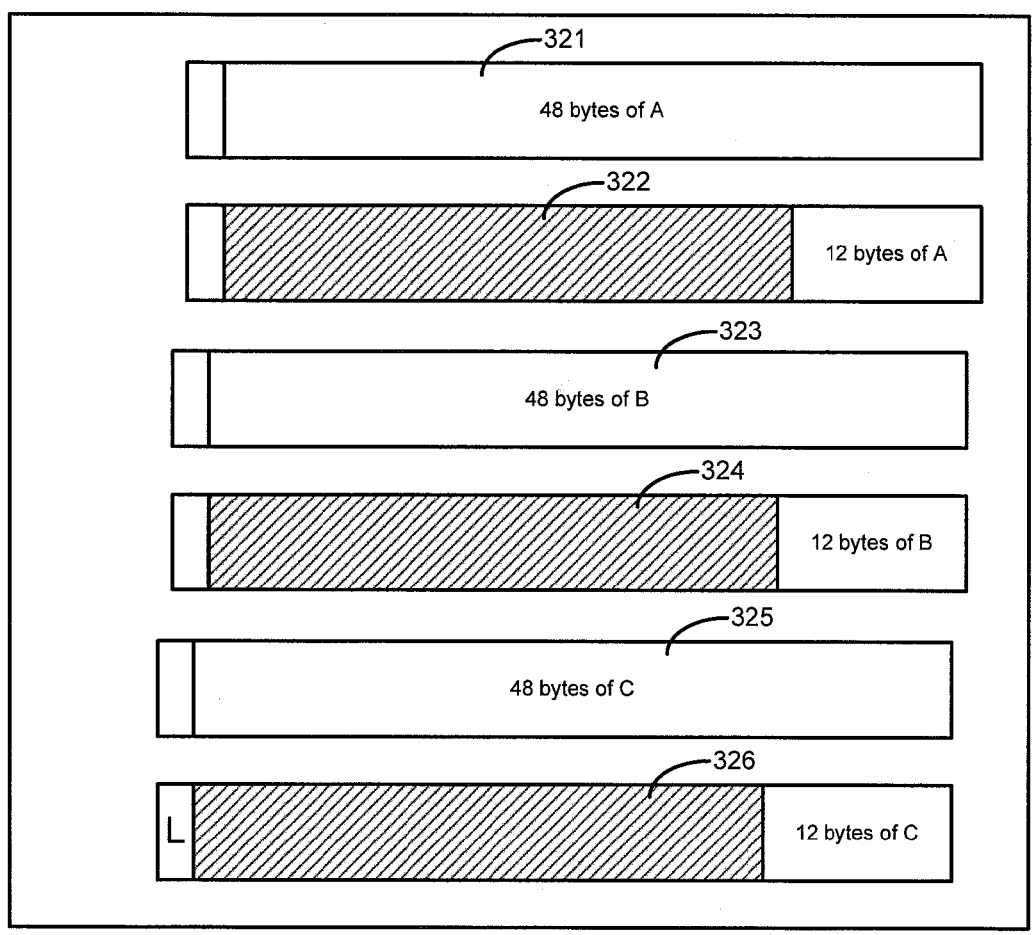

Another example is illustrated in FIG. 3C wherein the egress data unit is not a fixed-size cell but a variable size packet. In this example, each of three packets A, B, and C has a payload of 60 bytes, and each is a fragment of a single packet that conforms to the Internet Protocol (IP). Assembly of the single packet by egress network processor 205 is aided by setting the "L" flag by ingress network processor 202 only after the last fragment "C" is received. Until fragment "C" is received, the data from fragments "A" and "B" is held in buffers 321-325 of switch fabric 103.

Certain embodiments of the invention are used for segmentation and reassembly as described in AAL2. Specifically, in the receive direction (i.e. AAL2 cells to packets), such embodiments take AAL2 cells (which have the format illustrated in FIGS. 4A and 4B), which can contain multiple CPS packets (which have the format illustrated in FIGS. 4C and 4D), each of which can also span multiple cells, and reassemble complete packets. In the transmit direction (i.e. multiple source packets to AAL2 cells), such embodiments take short packets, and consolidate (e.g. equivalent to reassemble) them into AAL2 cells.

Figure 5A:
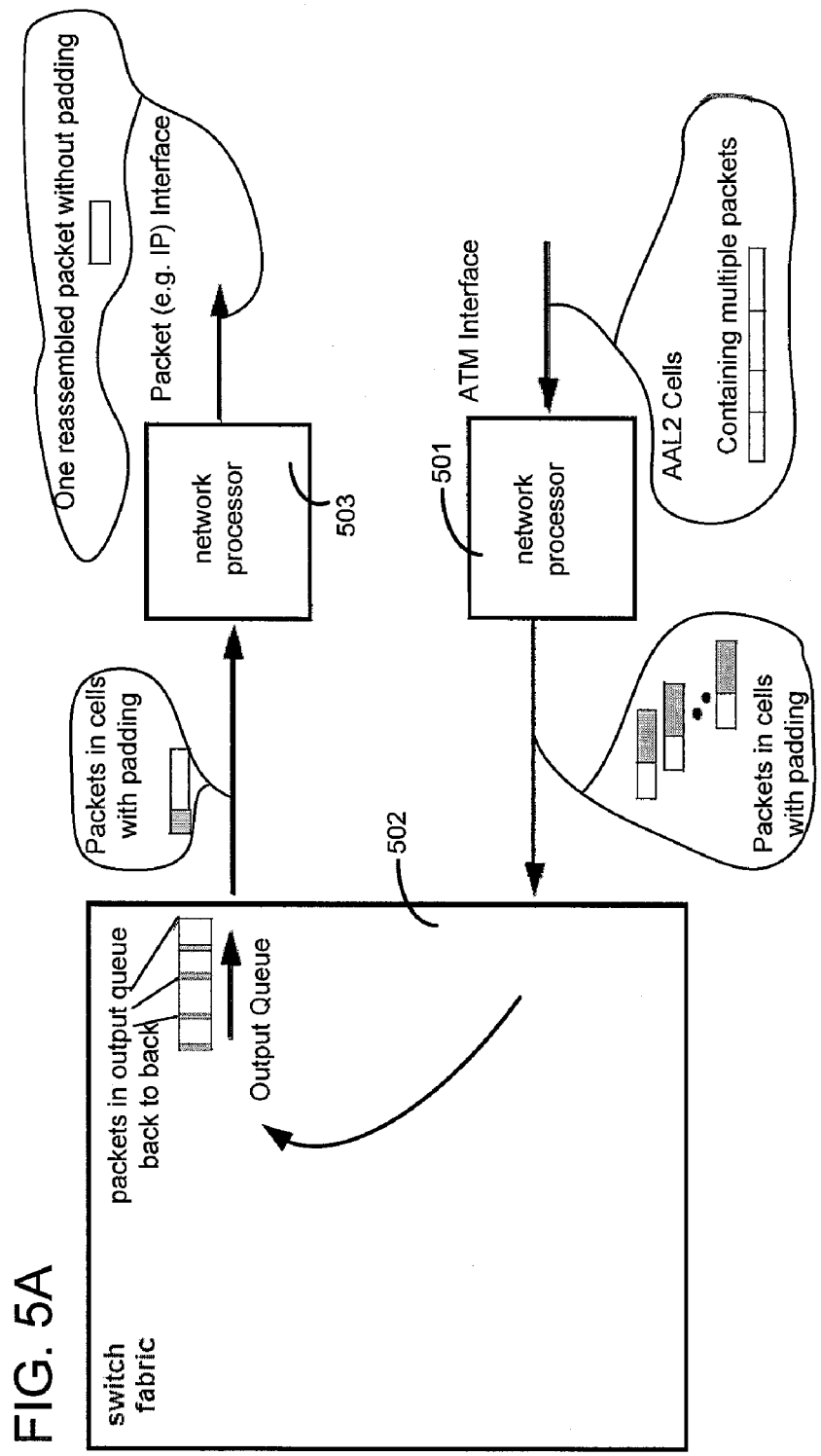
FIGS. 5A and 5B illustrate, in a high level block diagram and a flow chart respectively, reassembly of a packet from cells by some embodiments of an ingress network processor and an egress network processor.
Figure 5B:
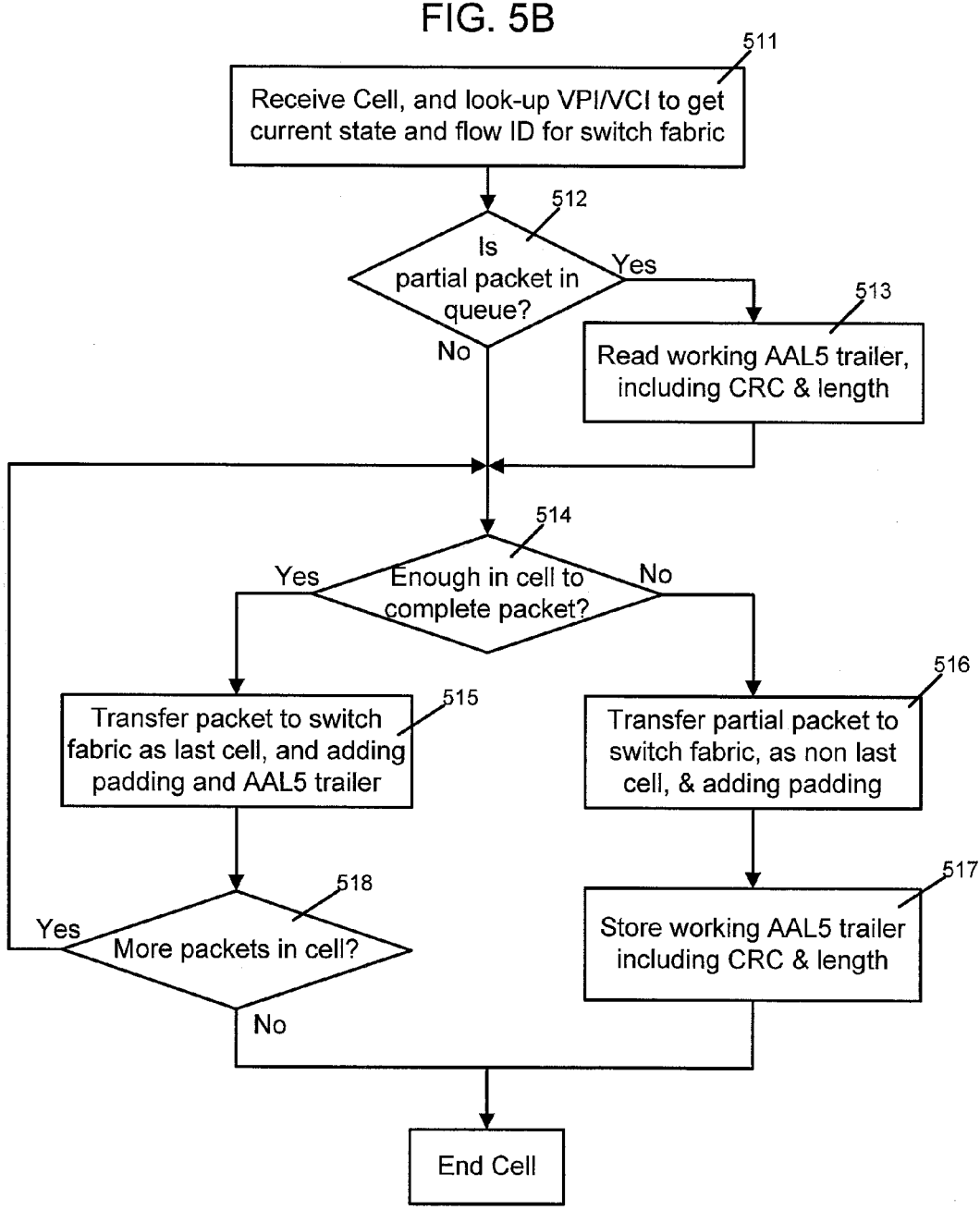

Reassembly in several embodiments of CPS packets that are received embedded in AAL2 cells is illustrated in FIGS. 5A and 5B. Specifically, AAL2 cells (containing one or more CPS packets) that are received (as per act 511) by an ingress network processor 501 are stored in switch fabric 502 as follows. Specifically, in act 512, ingress network processor 501 checks if a partial CPS packet has already been queued in switch fabric 502, and if so, reads the working AAL5 trailer including CRC and length (as per act 513) from the currently-received AAL2 cell, and goes to act 514. Ingress network processor 501 goes to act 514 directly from act 512 if a partial CPS packet has not been previously queued.

In act 514, ingress network processor 501 checks if there is enough in the currently-received AAL2 cell to form the complete packet. This check is necessary because a CPS packet may span two or more AAL2 cells. If all data for the CPS packet has been received, ingress network processor 501 goes to act 515 and transfers the currently-received data for the CPS packet to the switch fabric (including AAL5 trailer and padding as needed) with an "L" flag. Thereafter, ingress network processor 501 checks if there are any more CPS packets in the currently-received AAL2 cell, and if so returns to act 514.

In act 514, if the current AAL2 cell does not contain all the data of a CPS packet, then ingress network processor 501 goes to act 516 and transfers the data to switch fabric 502, but without the "L" flag. Prior to transferring the data, ingress network processor 501 adds padding as needed to fill out a data unit that is transferred between ingress network processor 501 and switch fabric 502.

Such a data unit may be, for example, a cell that conforms to the ViX protocol, although other data units may be used in other examples. Of note, such cells are frequently only partially filled with data, and the remainder of each cell is filled with padding. Moreover, such cells are locally stored by switch fabric 502 until receipt of a cell with the "L" flag at which time data from the received cell and all preceeding cells is transferred to the egress network processor 503.

In embodiments that use cells in conformance with the ViX format (e.g. of the type described in U.S. Pat. No. 5,440,523 that is incorporated by reference herein in its entirety), each cell is of a fixed length similar to ATM cells, except that the ViX cells are 64 bytes in length instead of 53 bytes in length. Each ViX cell has 16 bytes of overhead that is divided into cell header, user defined fields and reserved fields. The ViX cell header identifies the source and destination ports, and flow-specific information. Note that the above-described ViX format is not used in some embodiments.

The ViX cell header also includes information that is used to implement reassembly, such as a queue number (which identifies a queue in the switch fabric coupled to a destination or source network processor), an "L" flag for the last cell, and a flow ID that is used to identify whether AAL5 reassembly and removal of AAL5 encapsulation is required. If a specific bit in flow ID is clear, then the current cell is considered part of a packet and AAL5 reassembly and removal of the AAL5 encapsulation is performed. If the just-described bit is set, then this cell is considered a single cell and passed to the network processor untouched with no AAL5 processing.

After act 516, ingress network processor 501 goes to act 517 and stores in its own local memory the working AAL5 trailer and the CRC and length for the data that has been sent to switch fabric 502 without the "L" flag, so that this information can be later used when the remaining data of the CPS packet arrives. Therefore, only the last CPS packet fragment that is sent to switch fabric 502 (in a partially filled cell) contains the AAL5 trailer (which includes the length and CRC-32 calculated over the full AAL5 packet, including the inserted padding, not just that final fragment) and last cell indication.

Furthermore, ingress network processor 501 is also programmed with a watchdog timer to flush incomplete cells packets in each queue. If a partially reassembled CPS packet is in a queue for longer than a predetermined time out period, it is aborted by queuing a dummy last cell to this queue, with an incorrect AAL5 trailer and CRC-32 so that it will be discarded by egress network processor 503.

As noted above, each queue in switch fabric 502 is configured in packet mode so that each CPS packet (whether spanning more than one cell or not) is sent to egress network processor 502 as back-to-back cells. In egress network processor 502, the AAL5 trailer is removed, and the padding is also removed.

Where the CPS packet is in a single cell in the queue, the AAL5 trailer and padding is removed automatically by a ViX interface, and all that is required of egress network processor 502 is to add the appropriate egress packet header for the packet interface (eg. RTP/UDP/IP header).

Where data for the CPS packet is received from switch fabric 502 in multiple cells, the AAL5 trailer and padding in the last cell is removed automatically by the ViX interface, but the padding in the middle (which was inserted for the non-last fragments) needs to be removed by egress network processor 502 before adding the appropriate egress packet header for the packet interface (eg. RTP/UDP/IP header).

Figure 5C:
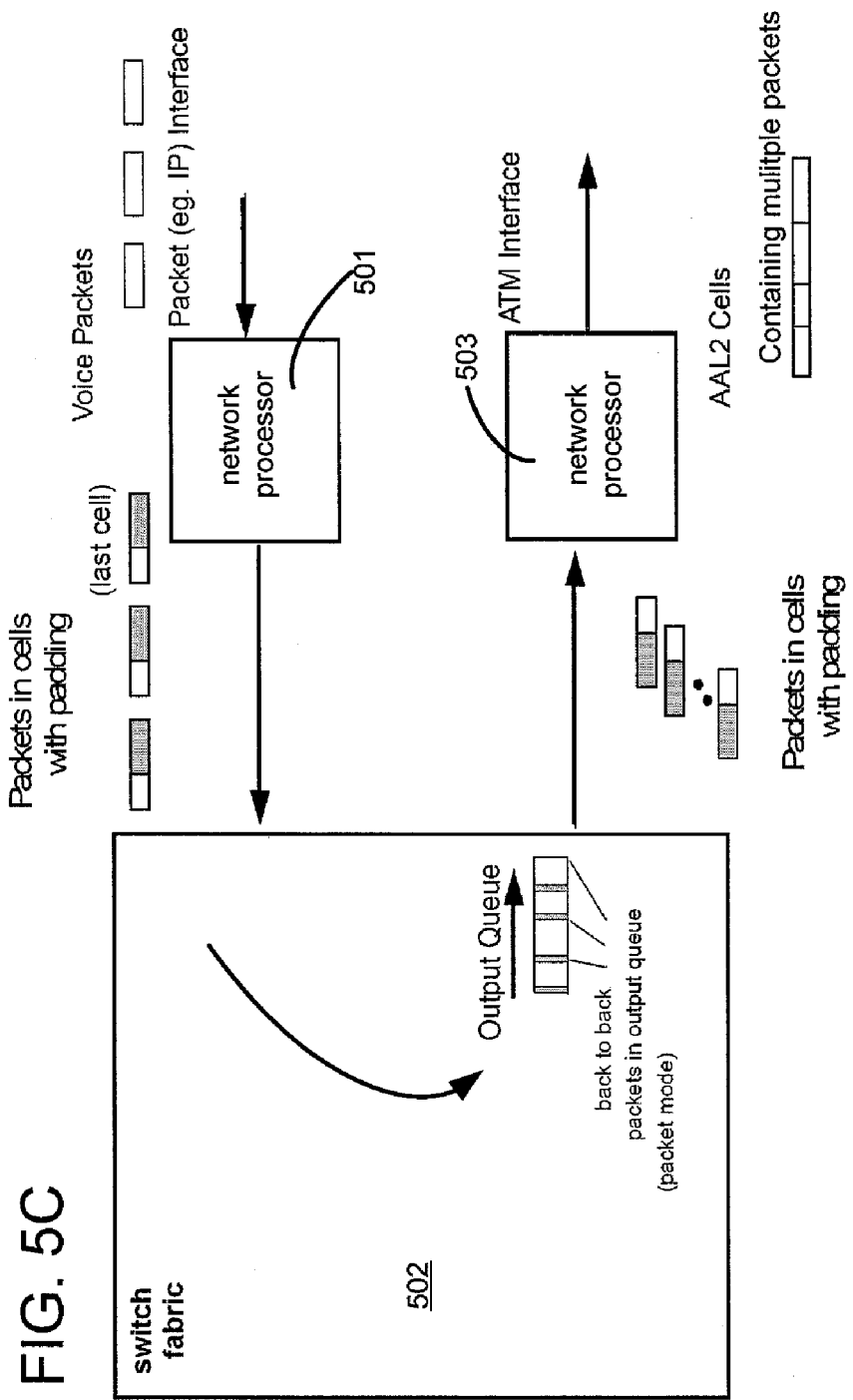

FIGS. 5C and 5D illustrate operation of several embodiments that segment CPS packets for formation of AAL2 cells. Specifically, ingress network processor 501 receives complete voice packets, and these CPS packets need to be distributed into cells. Acts 521-528 that are performed by ingress network processor 501 are similar to the corresponding acts 511-518 described above for FIG. 5B. Specifically, in act 521, ingress network processor 501 takes each voice packet, and checks if data for an AAL2 cell has been already queued (as per act 522) and if so, reads the working AAL5 trailer including CRC and length (as per act 523). In either case of act 522, ingress network processor 501 goes to act 524.

Next, ingress network processor 501 determines (as per act 524) whether this packet can fit into a current AAL2 cell (that is to be formed by egress network processor 502) for the required VPI/VCI. If the CPS packet can fit into the current AAL2 cell, ingress network processor 501 writes the data (as per act 525) for this CPS packet into a single buffer in switch fabric 502 (including CPS packet header, and with padding added to fill out the buffer, and with the last flag "L" set).

In performing act 525, if a CPS packet is longer than the space available in the current AAL2 cell, the CPS packet is written into multiple buffers in switch fabric 502. Specifically, one buffer is filled (as per act 525) with only sufficient data to complete the AAL2 cell, and that buffer is flagged with the last flag "L" set. This buffer also contains the AAL5 trailer (which includes the length and CRC-32 calculated over the full 'AAL2 cell', including the inserted padding). The remaining data of the CPS packet is written into another buffer, without last flag "L" being set (as per act 529). The working AAL5 trailer, CRC and length are saved (as per act 530) for future use.

Therefore, data for each AAL2 cell is queued in switch fabric 502 in multiple buffers, each containing a single CPS packet or packet fragment, with the multiple buffers making up an AAL5 cell, and all unused locations of all buffers are filled with padding.

On egress, each output queue is configured in packet mode so that each AAL5 packet (whether spanning more than one cell or not) is scheduled as back-to-back cells. In the egress network processor 503, the AAL5 trailer is removed, and the padding removed. Where the AAL5 packet is in a single cell, the AAL5 trailer and padding is removed automatically by a ViX interface in the network processor, and all that is required of the software in egress network processor 503 is to add the appropriate ATM cell header for the egress ATM interface. Where the AAL5 packet is in multiple cells, the AAL5 trailer and padding in the last cell is removed automatically by the ViX interface, but the padding in the middle (which was inserted for the non-last fragments) needs to be removed by software before adding the appropriate ATM cell header for the egress ATM interface.

Several embodiments of the type described herein may be implemented using the nPX5700/nP7250 chipset available from Applied Micro Circuits Corporation, although other implementations may also be made using other commercially available chipsets as would be apparent to the skilled artisan in view of this disclosure.

Numerous modifications and adaptations of the embodiments, examples and implementations described herein will be apparent to the skilled artisan in view of the disclosure.

Although in some embodiments, segmentation and reassembly have been described above in the context of AAL2, reassembly of fragments of an IP packet may also be performed in the manner described herein. In some embodiments, such reassembly of IP packet fragments is performed in addition to reordering of out of order fragments by use of a loop between a network processor and a switch fabric as described in the related U.S. patent application Ser. No. 10/211,080 entitled "Reassembly of Out-of-order Data Fragments In A Network" by Ari Birger, Dayne A. Reast and Benjamin Hur which has been incorporated by reference above.

Moreover, any value may be used as a padding byte if such a value is expected to not occur in real data. The value for a padding byte may be assigned by the user, in some embodiments. Furthermore, a header of a cell transferred between the network processor and the switch fabric may contain a field (e.g. in user data) that indicates the amount of valid data in the cell (e.g. similar to packet length).

Although only certain functions are identified above as being performed by an ingress network processor in some embodiments, in other embodiments such an ingress network processor may perform a number of other functions, such as identifying and extracting various packet headers, performing table lookups using information from the packet headers, updating counters for protocol processing, examining flow control information and checking for conformance with preallocated bandwidth, and creating fixed-size cells for transmission through the switch fabric.

Moreover, although network processors and switch fabrics of a particular architecture have been described above, these are merely illustrative. Therefore, any network processor and any switch fabric may be used as described herein. For more information on other types of network processors, see "Understanding Network Processors" by Niraj Shah (available over the Internet at http://www.cs.ucsd.edu /classes/sp02/cse291_E/reading/UnderstandNP.pdf) that is incorporated by reference herein in its entirety. See also http://www.commsdesign.com/dcenters/netprocessing.

Furthermore, although certain embodiments use cells (e.g. in the ViX format) when transferring data between a network processor and a switch fabric, other embodiments may not use any cells (e.g. such other embodiments may employ one or more packet switches in the switching fabric instead of cell switches).

Moreover, queues of the type described herein (such as queues 206 and 207 illustrated in FIG. 2A) contain fixed-size buffers which may simply be locations in random access memory (RAM). RAM containing such queues may be implemented in a switch fabric (1) on-chip (i.e. in an integrated circuit (IC) chip in which a switch fabric is implemented) or (2) off-chip (i.e. in an IC chip different from but accessible only by a switch fabric), or (3) partly on-chip and partly off-chip. The last-described embodiment can be implemented with a caching scheme.

Furthermore, depending on the embodiment, spreading of a reassembly and/or a segmentation function may be across (i.e. partially performed in) one or more network processor(s) and one or more switch fabric(s) that are respectively implemented as different logic blocks in a single IC chip or as different IC chips mounted on a single printed circuit board (PCB), or as different PCBs mounted in a single chassis.

Numerous such examples, embodiments, implementations and variations are within the scope of the appended claims.

The invention claimed is:

1. A method of temporarily holding data during transfer through a network, the method comprising:
    receiving data in at least one data unit (hereinafter "ingress data unit");
    saving the data received in the ingress data unit in a plurality of buffers of fixed size and storing padding in unused locations of a last buffer in the plurality of buffers;
    retrieving said data and said padding together, from said plurality of buffers;
    forming an egress data unit for transmission using said data without said padding from said last buffer;

wherein the data in the ingress data unit is insufficient to form the egress data unit;
receiving additional data in another data unit; and
if the data in the plurality of buffers and the additional data together is in an amount sufficient to form the egress data unit:
  saving into at least one additional buffer, a portion of additional data needed to form the egress data unit when used with data in the plurality of buffers;
  storing additional padding in any unused locations of the additional buffer;
  retrieving the additional data and the additional padding together, from the at least one additional buffer;
  wherein said forming comprises concatenating said additional data to said data thereby to remove said padding, and said egress data unit is formed without said additional padding from said additional buffer.

2. The method of claim 1 wherein the data is received in a network processor, the buffers are located in a storage device separate and distinct from the network processor, and the method further comprises:
  the network processor transferring data to the storage device during the saving; and
  the network processor transferring padding to the storage device during the storing.

3. The method of claim 2 wherein said network processor is hereinafter "ingress network processor" and the forming of the egress data unit without said padding is performed in an egress network processor different from the ingress network processor.

4. The method of claim 2 wherein said receiving, said retrieving and said forming are performed by said network processor.

5. A method of temporarily holding data during transfer through a network, the method comprising:
  a first network processor receiving a first ingress data unit comprising data;
  the first network processor saving at least a portion of data from the first ingress data unit in a plurality of buffers in a storage device coupled to each of the first network processor and a second network processor;
  the first network processor storing padding of a first amount in any unused locations of a last buffer in the plurality of buffers wherein data of the first ingress data unit has been saved;
  the first network processor receiving a second ingress data unit comprising additional data, and if the data received in the first ingress data unit and the additional data received in the second ingress data unit are together needed to form the egress data unit:
    the first network processor saving into at least one additional buffer in the storage device, at least a portion of the additional data, and the first network processor storing padding of a second amount in any unused locations of the additional buffer; and
    the second network processor retrieving the data and the first amount of padding from the storage device, and the second network processor further retrieving the additional data and the second amount of padding from the storage device, the second network processor concatenating the data and the additional data together to remove at least the first amount of padding, to form the egress data unit; and
    the second network processor transmitting on the network the egress data unit without the second amount of padding.

6. The method of claim 5 further comprising:
  the first network processor transferring data to the storage device during the saving; and
  the first network processor transferring padding to the storage device during the storing.

7. An apparatus for processing a plurality of data units, the apparatus comprising:
  means for receiving data in at least one data unit (hereinafter "ingress data unit");
  means for saving the data received in the ingress data unit in a plurality of buffers of fixed size and storing padding in unused locations of a last buffer in the plurality of buffers;
  means for retrieving said data and said padding together, from said plurality of buffers;
  means for forming an egress data unit for transmission using said data without said padding from said last buffer;
  wherein the data in the ingress data unit is insufficient to form the egress data unit;
  wherein the means for receiving receives additional data in another data unit; and
  means for checking if the data in the plurality of buffers and the additional data together is in an amount sufficient to form the egress data unit:
  means for saving into at least one additional buffer, a portion of additional data needed to form the egress data unit when used with data in the plurality of buffers;
  means for storing additional padding in any unused locations of the additional buffer;
  means for retrieving the additional data and the additional padding together, from the at least one additional buffer;
  wherein said means for forming comprises means for concatenating said additional data to said data thereby to remove said padding, and said egress data unit is formed without said additional padding from said additional buffer.

8. The apparatus of claim 7 wherein said means for receiving, said means for retrieving and said means for forming are comprised in a network processor.

* * * * *

UNITED STATES PATENT AND TRADEMARK OFFICE
CERTIFICATE OF CORRECTION

| | |
|---|---|
| PATENT NO. | : 7,372,864 B1 |
| APPLICATION NO. | : 10/211098 |
| DATED | : May 13, 2008 |
| INVENTOR(S) | : Dayne A. Reast |

It is certified that error appears in the above-identified patent and that said Letters Patent is hereby corrected as shown below:

<u>Column 6</u>

Line 14, "1/2" should be changed to --2--; and

Line 15, "M" should be changed to --1/2--.

Signed and Sealed this

Twenty-third Day of September, 2008

JON W. DUDAS
*Director of the United States Patent and Trademark Office*